United States Patent
Weber et al.

(10) Patent No.: US 9,514,349 B2
(45) Date of Patent: Dec. 6, 2016

(54) METHOD OF GUIDING A USER OF A PORTABLE ELECTRONIC DEVICE

(71) Applicant: Fingerprint Cards AB, Göteborg (SE)

(72) Inventors: Sebastian Weber, Malmö (SE); Stefan Printz, Malmö (SE); Olis Olofsson, Malmö (SE)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 15/054,179

(22) Filed: Feb. 26, 2016

(65) Prior Publication Data

US 2016/0253544 A1 Sep. 1, 2016

(30) Foreign Application Priority Data

Feb. 27, 2015 (SE) ........................ 1550229

(51) Int. Cl.
  *G06K 9/00* (2006.01)
  *G06K 9/36* (2006.01)
  *G06F 3/0481* (2013.01)

(52) U.S. Cl.
  CPC ......... *G06K 9/00013* (2013.01); *G06F 3/0481* (2013.01)

(58) Field of Classification Search
  USPC ................................ 382/124, 284
  See application file for complete search history.

(56) References Cited

U.S. PATENT DOCUMENTS

| | | | | |
|---|---|---|---|---|
| 5,828,773 A * | 10/1998 | Setlak | ................. | G06K 9/0002 382/126 |
| 8,077,935 B2 | 12/2011 | Geoffroy et al. | | |
| 2002/0003892 A1 * | 1/2002 | Iwanaga | ............ | G06K 9/00026 382/124 |
| 2003/0123714 A1 * | 7/2003 | O'Gorman | ......... | G06K 9/00899 382/124 |
| 2005/0105782 A1 * | 5/2005 | Abiko | ................ | G06K 9/00026 382/124 |
| 2005/0169506 A1 * | 8/2005 | Fenrich | .............. | G06K 9/00026 382/127 |
| 2006/0078176 A1 * | 4/2006 | Abiko | ................ | G06F 3/03547 382/124 |
| 2008/0317306 A1 * | 12/2008 | Hamilton | .......... | G06K 9/00026 382/128 |
| 2010/0303311 A1 * | 12/2010 | Shin | ...................... | G06K 9/036 382/124 |

(Continued)

FOREIGN PATENT DOCUMENTS

| | | | |
|---|---|---|---|
| AU | 2014262191 A1 | 11/2014 | |
| EP | 1531419 A2 | 5/2005 | |

OTHER PUBLICATIONS

International Search Report and Written Opinion for International Application No. PCT/SE2016/050154 mailed May 27, 2016 (12 pages).

*Primary Examiner* — Kathleen Y Dulaney (74) *Attorney, Agent, or Firm* — Remarck Law Group PLC (57) ABSTRACT

The present invention relates to a method of guiding a user of a portable electronic device when operating a fingerprint sensor comprised with the portable electronic device. The invention allows for an improved enrollment process as well as for general improvements when using the fingerprint sensor. The invention also relates to a corresponding electronic device and to a computer program product.

27 Claims, 4 Drawing Sheets

(56) References Cited

U.S. PATENT DOCUMENTS

| | | | | |
|---|---|---|---|---|
| 2012/0174214 | A1* | 7/2012 | Huang | G06F 21/32 |
| | | | | 726/19 |
| 2013/0070073 | A1* | 3/2013 | Higuchi | H04N 7/18 |
| | | | | 348/77 |
| 2013/0176109 | A1* | 7/2013 | Higuchi | G05B 1/01 |
| | | | | 340/5.83 |
| 2013/0182921 | A1* | 7/2013 | Iwata | G06K 9/00912 |
| | | | | 382/126 |
| 2013/0329967 | A1* | 12/2013 | Abiko | G06K 9/00026 |
| | | | | 382/115 |
| 2014/0003677 | A1* | 1/2014 | Han | G06K 9/00006 |
| | | | | 382/124 |
| 2014/0003678 | A1* | 1/2014 | Vieta | G06K 9/00026 |
| | | | | 382/124 |
| 2014/0003679 | A1* | 1/2014 | Han | G06K 9/00013 |
| | | | | 382/124 |
| 2016/0203354 | A1* | 7/2016 | Choi | G06K 9/00026 |
| | | | | 382/124 |

\* cited by examiner

METHOD OF GUIDING A USER OF A PORTABLE ELECTRONIC DEVICE

CROSS-REFERENCE TO RELATED APPLICATIONS

This application claims the benefit of Swedish Patent Application No. 1550229-7 filed Feb. 27, 2015. The disclosure of the above application is incorporated herein by reference in its entirety.

FIELD OF THE INVENTION

The present invention relates to a method of guiding a user of a portable electronic device when operating a fingerprint sensor comprised with the portable electronic device. The invention also relates to a corresponding electronic device and to a computer program product.

BACKGROUND OF THE INVENTION

Various types of biometric systems are used more and more in order to provide for increased security for accessing an electronic device, thereby providing an enhanced user convenience. In particular fingerprint sensors have been successfully integrated in such devices, for example, thanks to their small form factor, high performance and user acceptance. Among the various available fingerprint sensing principles (such as capacitive, optical, thermal etc.), capacitive sensing is most commonly used, in particular in applications where size and power consumption are important issues.

To save cost and valuable surface space, there is an effort towards smaller and smaller fingerprint sensors. In contrast to "all at once" fingerprint scanners, which capture an image of an entire fingerprint at the same time, such smaller fingerprint sensors may be substantially smaller than the user's fingerprint. By imaging only a portion of a fingerprint at any given time, the size and cost of a partial fingerprint sensor can be made considerably smaller and cheaper than that of a full fingerprint sensor. A plurality of the smaller fingerprint image portions are then combined into a complete fingerprint image, e.g. by means of feature extraction.

For allowing the smaller fingerprint image portions to be combined with each other, it is desirable if each of the fingerprint image portions has a sufficient level of quality. This typically place constrains on how the finger is contacting the fingerprint sensor. Due to various human factors issues, it is not so easy for the user to know exactly how to position his finger in relation to the fingerprint sensor, and different users will place their fingers in different ways. In order to account for this type of variation, modern partial fingerprint sensors often incorporate mechanical means for guiding the user (e.g. a depression) and/or finger position sensors to determine the finger position in relation to the fingerprint sensor.

An example of a fingerprint system comprising such a finger position sensor is disclosed in U.S. Pat. No. 8,077,935, the finger position sensor including a position pickup plate and multiple position drive plates. During operation, the drive plates are energized sequentially with signal bursts. In the case where a finger is in contact or near contact with the energized drive plate and the pickup plate, the signal burst is conducted through the bulk of the finger to the pickup plate. In the case where the finger is not in contact with the energized drive plate, the signal burst is conducted through air to the pickup plate, and a much smaller signal is detected. Thus, the sensed signal level indicates whether the finger is in contact with the energized drive plate and the pickup plate. By analyzing the detected signals from all of the drive plates, the position of the finger end can be determined and the user may be provided with an indication of an actual finger placement and a desired finger placement of the finger in relation to the fingerprint sensor.

Even though the fingerprint sensing system according to U.S. Pat. No. 8,077,935 provides for improvements in relation to the use of "smaller" fingerprint sensors, the additional inclusion of the finger position sensor limits the mounting possibilities in relation to a portable electronic device, such as a mobile phone, where the available real-estate is highly limited. In addition, the suggested guidance does not take into account the fact that different users have different levels of experience of using fingerprint sensors and thus need different level of guidance.

Further attention is drawn to US 2010/0303311 A1, guiding a user as how to positioning his finger in relation to a fingerprint sensor. The guiding is directly related to a current position of the finger in relation to the fingerprint sensor.

SUMMARY

In view of the above-mentioned and other drawbacks of the prior art, it is an object of the present invention to aid the user's placement of the finger on the fingerprint sensor by providing proper guidance for the purpose of ensuring optimal performance, typically without having to resort to including mechanical guiding means.

According to an aspect of the present invention, it is therefore provided a method of guiding a user of a portable electronic device, the electronic device comprising a display unit configured to display a graphical user interface (GUI), a fingerprint sensor having an array of pixels and configured for capturing a fingerprint representation of a fingerprint pattern of a finger, and a control unit connected to and configured to control the operation of the display unit and the fingerprint sensor, wherein the method comprises the steps of acquiring, at a first instance in time, a first partial fingerprint image of a corresponding first portion of a fingerprint pattern using the fingerprint sensor, determining, based on the first partial fingerprint image, a first arrangement of the finger in relation to the fingerprint sensor, selecting a first user guidance based on the first finger arrangement, providing the first user guidance to the user for rearranging the finger in relation to the fingerprint sensor, acquiring, at a second instance in time, a second partial fingerprint image of a corresponding second portion of the fingerprint pattern using the fingerprint sensor, determining, based on the second partial fingerprint image, a second arrangement of the finger in relation to the fingerprint sensor, selecting a second user guidance taking into account both the first and the second finger arrangement, and providing the second user guidance to the user for arranging the finger in relation to the fingerprint sensor.

The present invention is based upon the realization that it is desirable to automatically adapt the guidance provided to a user when using a fingerprint sensor comprised with an electronic device. That is, the guidance to be shown, e.g. within the GUI provided at the display unit should target a specific behavior of the user, to adaptively guide the user to use the fingerprint sensor in the most optimal way for achieving a good finger enrollment as well as for using the fingerprint sensor in the best possible way during general use of the electronic device. That is, the acquisition of a high quality partial fingerprint image will allow for successful feature extraction, in turn typically an essential part in achieving a successful enrollment as well as verification/authentication of the users fingerprint, e.g. for use in unlocking the electronic device, for verifying a purchase, etc. Accordingly, the invention allows for an improved enrollment process as well as an improved general use of the fingerprint sensor. Within the context of the invention, it should be understood that user guidance may be provided to the user in other ways, such as for example by means of an audio instruction or using haptic feedback.

This is specifically apparent when using smaller fingerprint sensors, typically defined as a fingerprint sensor that is substantially smaller than the user's fingerprint. In such a scenario, the user may not necessarily (at least when starting to use the electronic device) have an adequate understanding of how to use the fingerprint sensor of the electronic device. In addition, the fingerprint sensor may be mounted/integrated/arranged without mechanical guiding means for positioning the finger at the "correct" position in relation to the fingerprint sensor. Furthermore, in such a scenario it may not necessarily be apparent for the user how "hard" to press his finger towards the surface of the fingerprint sensor.

The present invention tries to solve this by providing an adaptive guiding of the user for arranging his finger in relation to the fingerprint sensor. As a first step, a first finger arrangement (also referred to as a finger position) is determined for the finger in relation to the fingerprint sensor. The determined first fingerprint arrangement is then used for selecting an adequate first guidance for the user to rearrange his finger in relation to the fingerprint sensor. As discussed above, rearrangement of the finger is typically necessary when using smaller fingerprint sensors, as a plurality of partial fingerprint images needs to be collected to determine a complete fingerprint image.

However, the request for rearrangement of the finger may also be made for instructing the user to move his finger such that a "better" partial fingerprint image may be acquired, i.e. for improving the quality of the partial fingerprint image. The first guidance may also be provided for requesting the user to "press harder" towards the surface of the fingerprint sensor, or for press less hard towards the surface of the fingerprint sensor.

Subsequently, a second finger arrangement is determined. As a result of the determination, a step is performed where a second user guidance is selected, where the selection process takes into account both the first and the second finger arrangement. Hence, this allows the process to "learn" how the user reacts to user guidance, and target the second user guidance based on this knowledge. For example, in case the user in fact is following the instructions provided in relation to the first user guidance, the user may be considered to be a (somewhat) experienced user and hence the second user guidance may be selected accordingly. However, in another case where it is determined that the user is not following the first user guidance, this may be seen as an indication that a novice user is using the fingerprint sensor, and hence the second user guidance may be selected differently as compared to the user guidance displayed to the experienced user.

In an embodiment, at least one of the first and the second user guidance is provided to the user by displaying the least one of the first and the second user guidance through the GUI. Possibly, the first user guidance is a graphical representation of relative position of the finger in relation to the fingerprint sensor. Preferably, the second user guidance is different from the first user guidance.

The process may be iterated further, such that e.g. the experienced user receives "less and less" pointer towards using the fingerprint sensor. Conversely, in case the user is non-responsive to the user guidance provided, an advance graphical illustration (or a video clip) may be shown within the GUI for guiding the user in using the fingerprint sensor.

The "level of experience" (or level of use corresponding to a desired way of using the sensor) for the user may for example be determined by comparing a desired finger arrangement with the actual finger arrangement. The difference may subsequently be used for selecting the adequate user guidance, e.g. the selected user guidance may be a function of the difference. One type of graphical user guidance displayed within the GUI could be a histogram corresponding to the result of the comparison. The histogram could be adapted to show both a lateral position of the finger in relation to the fingerprint sensor and quality metric for the partial fingerprint image acquired by the fingerprint sensor. The quality metric may be seen as an indication of the possibility of successful feature extraction (i.e. being a representation of the fingerprint) where sufficient contrast between ridges and valleys of the fingerprint. An indication of high quality of the partial fingerprint(s) will typically allow for an optimized (e.g. maximized) use of the fingerprint sensor. As mentioned above, successful feature extraction is typically essential for achieving a successful enrollment as well as verification/authentication of the users fingerprint. As understood from the above, determining the second finger arrangement further determining a quality metric for the second partial fingerprint image.

In an embodiment, the selection of the second user guidance based on the first and the second relative position comprises determining a difference between first finger arrangement and the second finger arrangement, and comparing the difference with a desired rearrangement of the finger in relation to the fingerprint sensor. Possibly, the desired rearrangement corresponds to at least a 10% repositioning of the finger in relation to the fingerprint sensor.

In a possible embodiment of the invention, the first user guidance is provided as a combined single visualization of the position of the finger in relation to the fingerprint sensor and the resulting quality metric. Possibly, a portion of a fingerprint pattern may be shown, where e.g. the thickness of the ridges of the fingerprint pattern is adjusted based on the quality metric. For example, an in comparison thicker ridge visualization (at the GUI) will be provided as an intuitive indication of a high contrast of the acquired first partial fingerprint image. Further examples of visualizing the quality metric may for example include showing a heat map within the GUI, possibly indicating a level of ease of feature extraction.

Still further, it may be possible to determine an area of the fingerprint pattern of the finger as compared to a total area of the fingerprint sensor (i.e. "sensor coverage"), and visualize this within the combined single visualization as mentioned above. For example, the portion of a fingerprint pattern shown in the GUI may change size depending on the present contact area.

In a possible alternative embodiment of the invention, the fingerprint sensor is mounted at a side (edge) of the electronic device, essentially perpendicular to the display unit. In such an embodiment, the fingerprint sensor may not be readily visible (during use) for the user. Hence, adequate guidance is of essence for acquiring a plurality of high quality partial fingerprint images to be able to form a fingerprint. The fingerprint may subsequently be used in an enrollment or verification process, e.g. for unlocking the electronic device. This will be further discussed below in relation to the detailed description of the invention. The fingerprint sensor may alternatively (or also) be arranged on the back of the electronic device.

According to the invention, the control unit is preferably an ASIC, a micro processor or any other type of computing device for controlling the operation of the fingerprint sensor. The control unit may be specifically adapted for controlling (only) the fingerprint sensor also be a general control unit comprised with the portable electronic device, for example configured for controlling the overall operation of the electronic device.

The fingerprint sensor may, as indicated above, be implemented using any kind of currently or future fingerprint sensing principles, including for example capacitive, optical, or thermal sensing technology. However, at present capacitive sensing is most preferred.

According to another aspect of the present invention, there is provided a portable electronic device, comprising a display unit configured to display a graphical user interface (GUI), a fingerprint sensor having an array of pixels and configured for capturing a fingerprint representation of a fingerprint pattern of a finger, and a control unit electrically connected to the fingerprint sensor and the display unit, wherein the control unit is configured to acquire, at a first instance in time, a first partial fingerprint image of a corresponding first portion of a fingerprint pattern using the fingerprint sensor, determine, based on the first partial fingerprint image, a first arrangement of the finger in relation to the fingerprint sensor, select a first user guidance based on the first finger arrangement, provide the first user guidance to the user for rearranging the finger in relation to the fingerprint sensor, acquire, at a second instance in time, a second partial fingerprint image of a corresponding second portion of the fingerprint pattern using the fingerprint sensor, determine, based on the second partial fingerprint image, a second arrangement of the finger in relation to the fingerprint sensor, select a second user guidance taking into account both the first and the second finger arrangement, and provide the second user guidance to the user for arranging the finger in relation to the fingerprint sensor. This aspect of the invention provides similar advantages as discussed above in relation to the previous aspect of the invention.

According to a further aspect of the present invention, there is provided a computer program product comprising a non-transitory computer readable medium having stored thereon computer program means for a control unit adapted for controlling a portable electronic device, the electronic device comprising a display unit configured to display a graphical user interface (GUI), a fingerprint sensor having an array of pixels and configured for capturing a fingerprint representation of a fingerprint pattern of a finger, and a control unit connected to and configured to control the operation of the display unit and the fingerprint sensor, wherein the computer program product comprises code for acquiring, at a first instance in time, a first partial fingerprint image of a corresponding first portion of a fingerprint pattern using the fingerprint sensor, code for determining, based on the first partial fingerprint image, a first arrangement of the finger in relation to the fingerprint sensor, code for selecting a first user guidance based on the first finger arrangement, code for providing the first user guidance to the user for rearranging the finger in relation to the fingerprint sensor, code for acquiring, at a second instance in time, a second partial fingerprint image of a corresponding second portion of the fingerprint pattern using the fingerprint sensor, code for determining, based on the second partial fingerprint image, a second arrangement of the finger in relation to the fingerprint sensor, code for selecting a second user guidance taking into account both the first and the second finger arrangement, and code for providing the second user guidance to the user for arranging the finger in relation to the fingerprint sensor. Also this aspect of the invention provides similar advantages as discussed above in relation to the previous aspects of the invention.

As mentioned above, the control unit is preferably an ASIC, a micro processor or any other type of computing device. Similarly, a software executed by the control unit for operating the inventive system may be stored on a non-transitory computer readable medium, being any type of memory device, including one of a removable nonvolatile random access memory, a hard disk drive, a floppy disk, a CD-ROM, a DVD-ROM, a USB memory, an SD memory card, or a similar computer readable medium known in the art.

In summary, the present invention relates to a method of guiding a user of a portable electronic device when operating a fingerprint sensor comprised with the portable electronic device. The invention allows for an improved enrollment process as well as for general improvements when using the fingerprint sensor.

Further features of, and advantages with, the present invention will become apparent when studying the appended claims and the following description. The skilled addressee realize that different features of the present invention may be combined to create embodiments other than those described in the following, without departing from the scope of the present invention

BRIEF DESCRIPTION OF THE DRAWINGS

The various aspects of the invention, including its particular features and advantages, will be readily understood from the following detailed description and the accompanying drawings, in which.

DETAILED DESCRIPTION OF EXAMPLE EMBODIMENTS

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person. Like reference characters refer to like elements throughout.

Figure 1A:
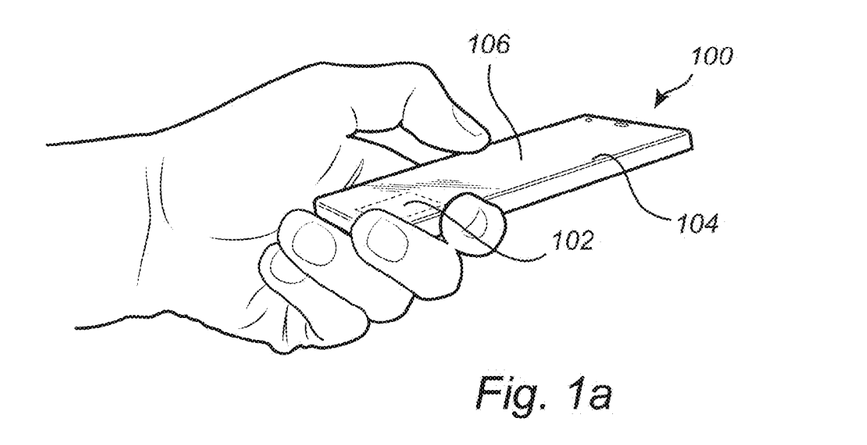
FIGS. 1a and 1b schematically exemplifies embodiment of the electronic device according to the present invention, in the form of a mobile phone comprising an integrated fingerprint sensor.

Turning now to the drawings and to FIG. 1a in particular, there is schematically illustrated an electronic device according to the present invention, in the form of a mobile phone 100 with an integrated fingerprint sensor 102 and a display unit 104 with a touch screen interface (graphical user interface, GUI) 106. In this embodiment the fingerprint sensor 102 and the display unit 104 are together arranged at the front side of the mobile phone 100. The fingerprint sensor 102 may, for example, be used for unlocking the mobile phone 100 and/or for authorizing transactions carried out using the mobile phone 100, etc.

Figures 1B, 2:
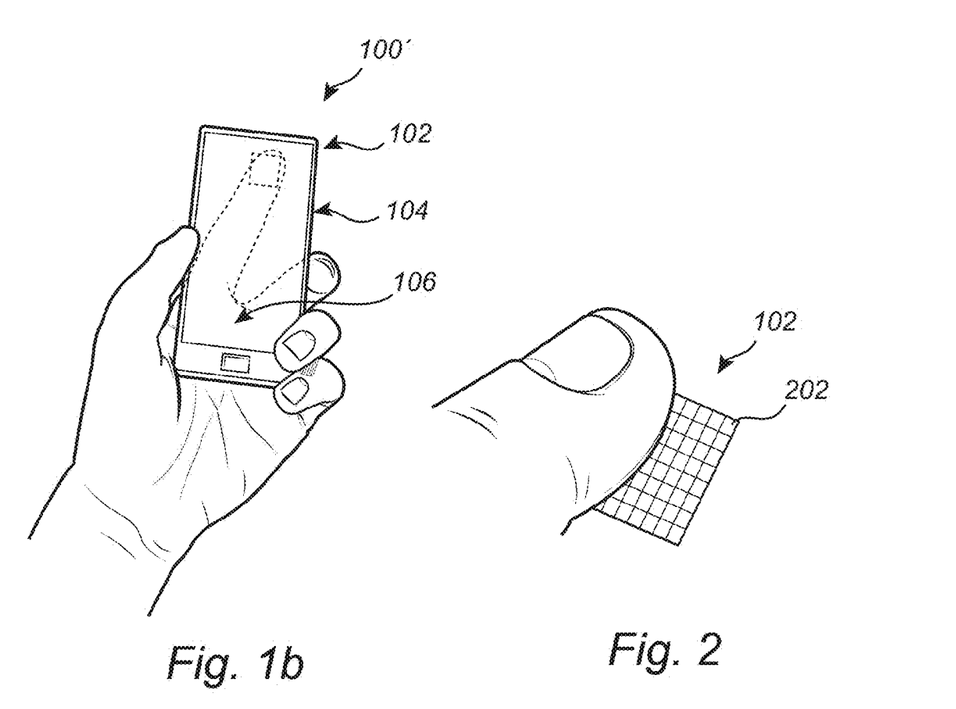
FIG. 2 schematically shows the fingerprint sensor array comprised in the electronic device in FIG. 1.

FIG. 1b schematically illustrates an alternative embodiment of the electronic device according to the present invention, where the display unit 104 is still arranged at the front side of the mobile phone 100', having the fingerprint sensor 102 alternatively arranged at the backside of the mobile phone 100'.

Preferably and as is apparent for the skilled person, the mobile phone 100 shown in FIG. 1 further comprises a first antenna for WLAN/Wi-Fi communication, a second antenna for telecommunication communication, a microphone, a speaker, and a phone control unit. Further hardware elements are of course possibly comprised with the mobile phone. It should be furthermore be noted that the invention may be applicable in relation to any other type of portable electronic device, such as a laptop, a remote control, a tablet computer, or any other type of present or future similarly configured device.

With reference to FIG. 2, there is conceptually illustrated a somewhat enlarged view of the fingerprint sensor 102. In the case of employing a capacitive sensing technology, the fingerprint sensor 102 is configured to comprise a plurality of sensing elements, preferably arranged as a two-dimensional array. A single sensing element (also denoted as a pixel) is in FIG. 2 indicated by reference numeral 202. It should however be noted understood that both one and two-dimensional sensors are possible and within the scope of the invention.

During use of the mobile phone 100, for example for unlocking the mobile phone 100, the user is required to arrange his finger onto the fingerprint sensor 102. In some implementations, the fingerprint sensor 102 may be integrated with the mobile phone 100 in such a way that it will not be readily apparent for the user exactly where on the front of the mobile phone 100 to place his finger, specifically for allowing the acquisition of a fingerprint image having a desired quality level. If the quality level is below a specified threshold, the user is generally repeatedly instructed to place his finger at the fingerprint sensor 102 until a fingerprint image having the desired quality level has been acquired. The level of quality may in one embodiment be defined as an indication of the possibility of successful feature extraction (i.e. being a representation of the fingerprint), for example where sufficient contrast between ridges and valleys of the fingerprint is identifiable. Successful feature extraction is typically essential for achieving a successful enrollment as well as verification/authentication of the users fingerprint, e.g. for use in unlocking the mobile phone 100, for verifying a purchase, etc.

As understood, in case position of the fingerprint sensor 102 is not readily apparent for the user, the instruction repetition may be somewhat annoying for the user. Thus, it is desirable to give the user a firm guidance on how and where to place his finger (in relation to the fingerprint sensor 102), where the guidance is selected to correspond to the actual use of the fingerprint sensor 102. Such a unapparent integration of the fingerprint sensor 102 may for example be if the fingerprint sensor is arranged to fully coincide with a front of the mobile phone 100, e.g. such that all of the front of the mobile phone 102 is "flat", i.e. without any (or only limited) mechanical guidance for the user in using the fingerprint sensor 102.

Figure 3:
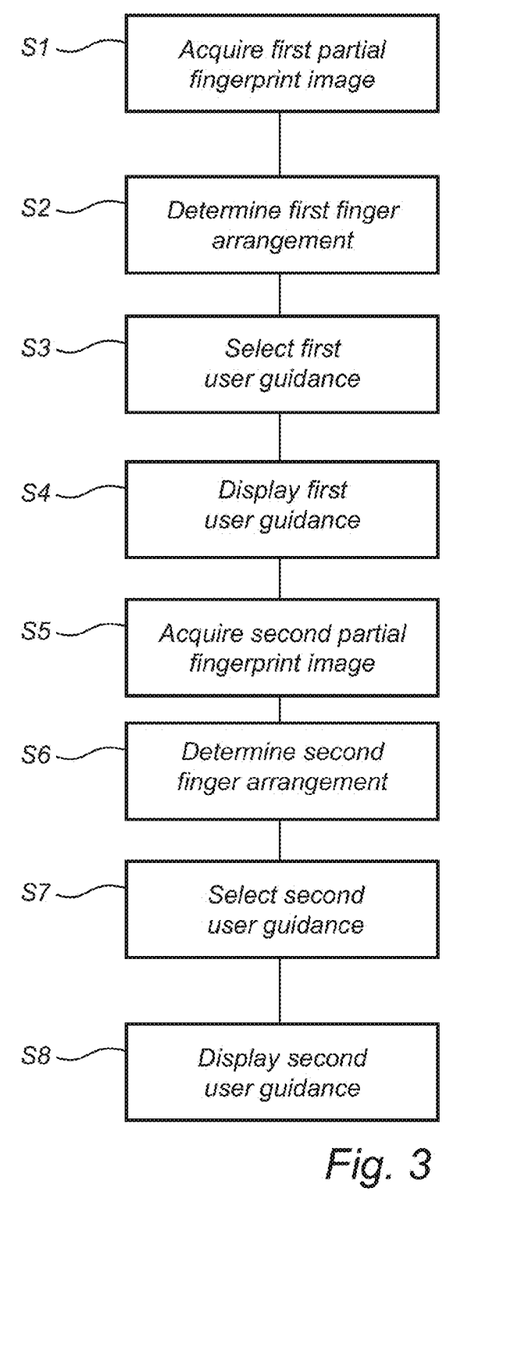
FIG. 3 is a flowchart illustrating the operation of the electronic device according to a currently preferred embodiment of the invention.
Figure 4A:
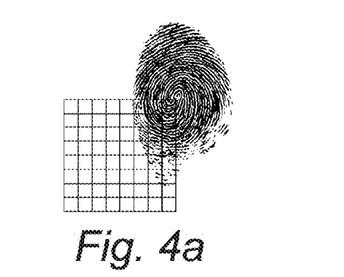
FIG. 4a-4e graphically illustrates selected steps of FIG. 3.

During operation of the inventive mobile phone 100, with further reference to FIGS. 3 and 4a-4e, the user is given user guidance within the GUI 106 provided at the display unit 104. The user guidance is specifically selected based on the arrangement of the finger in relation to the fingerprint sensor 102. In a first step, S1, a first partial fingerprint image of a corresponding first portion of a fingerprint pattern is at a first instance in time acquired using the fingerprint sensor 102. As is shown in FIG. 4a, the finger is placed somewhat out of center of the fingerprint sensor 102, exemplified as to be high up on the right hand side of the fingerprint sensor 102. It should be understood that the mobile phone 100 additionally may comprise a speaker and or means for providing haptic feedback (e.g. vibration). Such components may, within the scope of the invention, be used for (also or alternatively) provide the user guidance to the user.

Figure 4B:
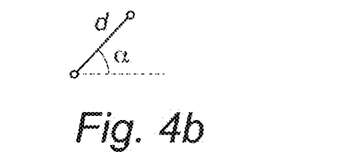

Based on the first partial fingerprint image, a first arrangement of the finger is determined, S2, in relation to the fingerprint sensor 102. In the exemplified embodiment as is shown in FIG. 4b, the determination of the arrangement of the finger in relation to the fingerprint sensor 102 will result in an angle, $\alpha$, and distance, d, from the center of the fingerprint sensor 102. This could of course be implemented in other, different, ways.

Based on the determined position, a specific first user guidance is selected, S3. The selection could in one embodiment be from one of a plurality of predesigned graphical illustrations stored in a memory element of the mobile phone 100, such as for example an "arrow" pointing the user in a direction towards the center of the fingerprint sensor 102. Alternatively, the user guidance may be rendered based on finger arrangement, e.g. based on the determined angle and distance of the finger in relation to the center of the fingerprint sensor 102.

Figure 4C:
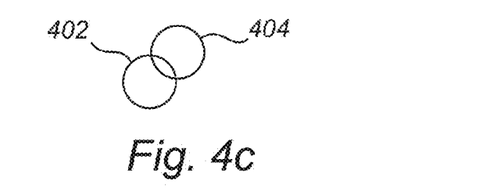

In the present embodiment as shown in FIG. 4c, an alternative to an arrow is displayed, S4, through the GUI 106; where a first circle 402 is shown indicating the fingerprint sensor 102, and a second circle 404 indicating the position of the finger is overlaid offset the first circle 402. The circles 402, 402, or the above mentioned arrows, will give the user a context to the present position of his finger in relation to the fingerprint sensor 102, and thereby guide the user to rearrange his finger towards e.g. the center of the fingerprint sensor 102.

Figure 4D:
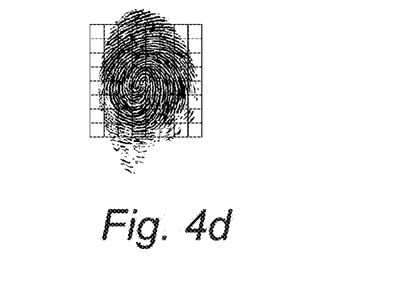

At a second instance in time, i.e. subsequent to the first instance in time, a second partial fingerprint image of a corresponding second portion of the fingerprint pattern is acquired, S5, using the fingerprint sensor 102. As is shown in FIG. 4d, the finger has now been rearranged towards the center of the fingerprint sensor 102. The subsequent determination, S6, of the position of the finger in relation to the fingerprint sensor 102 is based on the second partial fingerprint image, and now results in only a small deviation from the center of the fingerprint sensor 102.

Figure 4E:
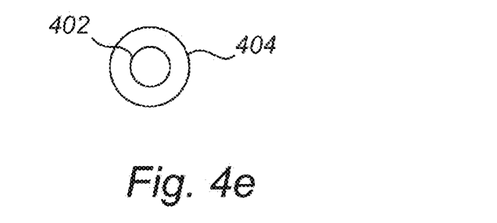

As the user apparently has followed the instruction provided by means of the first user guidance, second user guidance (in the present embodiment being slightly different from the first user guidance) is selected, S7, where the selection process takes into account both the first and the second finger placement. In the present embodiment as shown in FIG. 4e, the second user guidance is displayed, S8 as the first 402 and the second 404 circles essentially coinciding with each other. The coinciding circles 402, 404 accordingly illustrates that the finger is arranged in as is desired, for example for allowing a desirable feature extraction for the fingerprint.

In some instances the user will not directly follow the guidance provided by means of the first user guidance, for example by moving the finger in a "wrong" direction as compared to what was originally instructed/desired. In taking into account both the first and the second user guidance; the selection of the second user guidance may be somewhat different as compared to the scenario presented above. If as suggested above, the user moves his finger in the wrong direction, for example towards the top left hand side of the fingerprint sensor 102, then this may indicate that the user has not fully understood the first user guidance. The second user guidance (as discussed above being dependent on both the first and the second finger arrangement) may typically be selected to be different compared to what would be the case of the user repositioning his finger as was initially desired (i.e. as was instructed by means of the first user guidance). For example, the total distance diversion from the center of the fingerprint sensor 102 (e.g. the distance d for the first and the second fingerprint arrangement in relation to the center of the fingerprint sensor 102) may be determined and used for selecting the second user guidance.

In a possible embodiment of the invention, the process is typically iterated a preselected number of times before moving towards "another form" of user guidance, i.e. another form for the second user guidance as compared to the first user guidance. That is, the user may be allowed to place his finger in the "wrong position" the preselected number of time. However, once having placed his finger wrongly "too many times" another form of user guidance is selected and displayed to the user through the GUI 106. Such another type of user guidance may for example be a video clip instructing the user on how to use the fingerprint sensor 102. Such a video could for example include a tutorial on how to use the fingerprint sensor 102.

In the above description the fingerprint sensor 102 is positioned at the front of the mobile phone 100. In another embodiment (not explicitly shown) it may be possible to position the fingerprint sensor 102 at the back of the mobile phone 100. In such an implementation, the fingerprint sensor 102 will typically not be visual for the user during operation. Accordingly, providing guidance in a manner as discussed above will provide the user with improved usability of the fingerprint sensor 102, and consequently the mobile phone 100. The suggested circles 402, 404 or "arrows" may thus guide the user towards a desired position of the finger in relation to the fingerprint sensor 102. An elaboration of an implementation where the fingerprint sensor 102 is arranged at the back of the mobile phone provided below in relation to FIGS. 6a-6c.

Furthermore, the above description has been provided in relation to lateral repositioning of the finger in relation to the fingerprint sensor 102. It should however be understood that also an indication of a "distance" between the finger and the fingerprint sensor 102 could be determined and used for selecting the appropriate guidance to the user. Such a distance between the finger and the fingerprint sensor 102 may for example be seen as how hard the user is pressing towards the surface of the fingerprint sensor 102. Consequently, in some instances it may be desirable to select a guidance to the user for pressing further ("harder") towards the fingerprint sensor 102, or to press less hard towards the fingerprint sensor 102. Such a determination of the pressure applied by the user's finger towards the fingerprint sensor 102 may for example be made based on a width of ridges detected within the partial fingerprint image, based on a distance between the ridges (i.e. with of valley), or based on other known methods know to the person skilled in the art.

The ability to extract features from within the partial fingerprint images may be used as a quality metric for the partial fingerprint image. According to the invention, such a determined quality metric may in itself be used in selecting the appropriate user guidance.

Figures 5A, 5B:
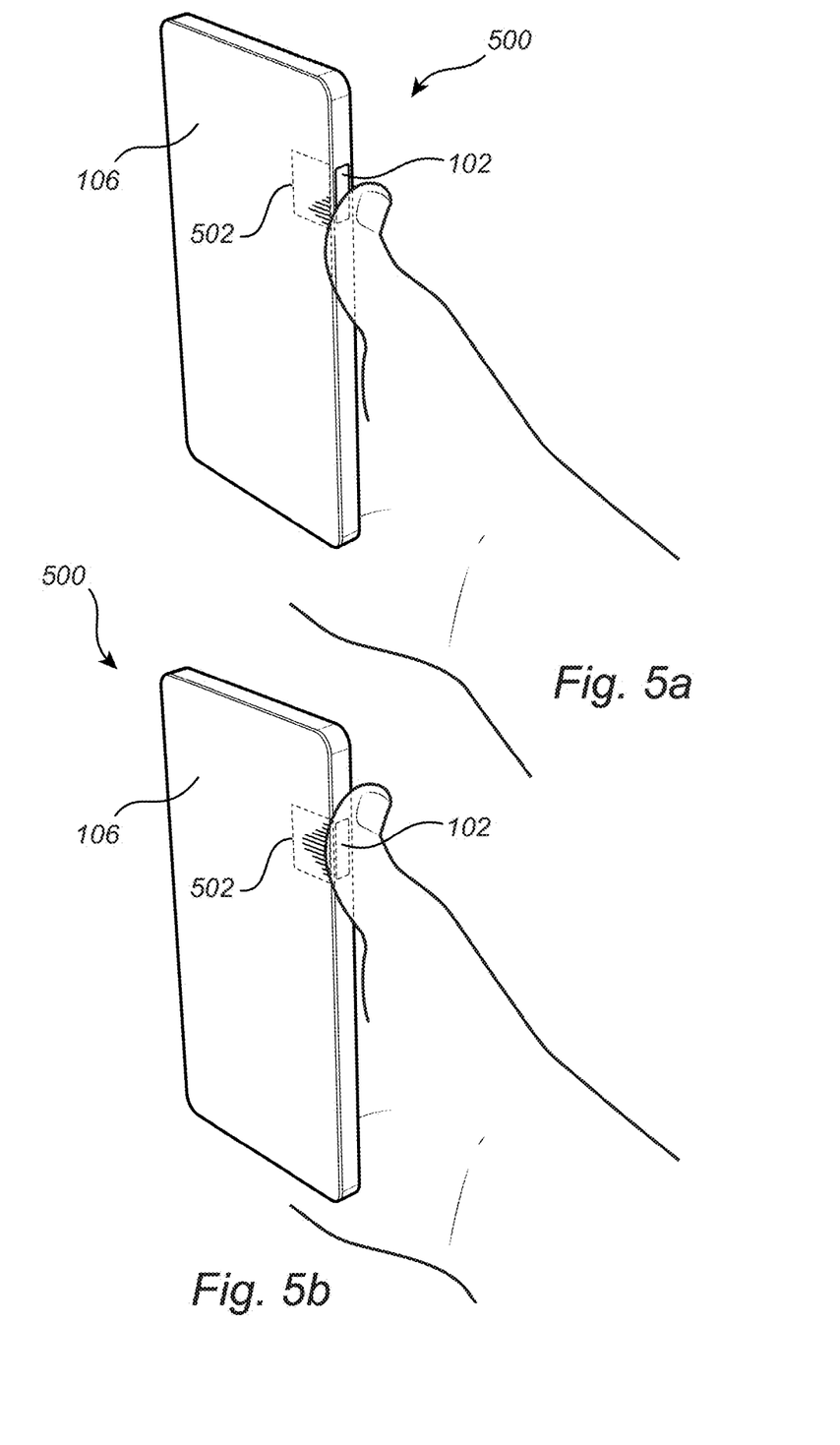
FIGS. 5a and 5b shows an alternative electronic device and user guidance according to an alternative embodiment of the invention, and FIGS. 6a-6c exemplifies graphical user guidance provided through the graphical user interface of the portable electronic device.

In an alternative embodiment, with further reference to FIGS. 5a and 5b, there is provided a mobile phone 500 similar to the mobile phone 100 shown in FIG. 1, but where the fingerprint sensor 102 has been placed on a side of the mobile phone 500, i.e. a side of the mobile phone 500 being essentially perpendicular to the front of the mobile phone 500.

In the present embodiment, the fingerprint sensor 102 is placed somewhat off central on the side, i.e. slightly towards the top o side of the mobile phone 500. Other possible relative placements are of course possible and within the scope of the invention. The fingerprint sensor 102 could also, possibly, be positioned at any of the top and the bottom sides of the mobile phone 500 (not shown). In FIGS. 5a and 5b, a front side section 502 of the GUI 106 is placed at a positioned corresponding to the position of the fingerprint sensor 102 on the side of the mobile phone 500. The front side section 502 presents a contextual representation of where the user is placing his finger in relation to the fingerprint sensor 102.

The front side section 502 may, as illustrated in relation to the present embodiment, be configured to illustrate a histogram giving the user an indication of how the finger is positioned in relation to the fingerprint sensor 102. For example, as is shown in FIG. 5a, in case the user places his finger off center of the fingerprint sensor 102 towards the bottom end of the mobile phone 500, the histogram will visualize an in comparison "low intensity" histogram having only an in comparison narrow distribution of fingerprint data (i.e. in the first instance in time being dependent on the first partial fingerprint image). The context of the histogram will consequently contextually guide the user to move his finger in a direction (on the side) towards the top of the mobile phone 500. The fingerprint sensor 102 will automatically acquire further partial fingerprint images and in a corresponding manner update the histogram based on the determination of the relative arrangement of the finger in relation to the fingerprint sensor 102. The front side section 502 of the GUI will accordingly be updated (first and second user guidance) with histogram data at a position where the user in fact is contacting the fingerprint sensor 102 with his finger.

The histogram may also, e.g. additionally, illustrate the above discussed quality metric for the acquired partial fingerprint images. The "height" or color of the bars in the histogram may be used for such an indication of the quality metric. In all, the guidance provided to the use will allow the user to maximize the use of the fingerprint sensor 102.

Figure 6A:
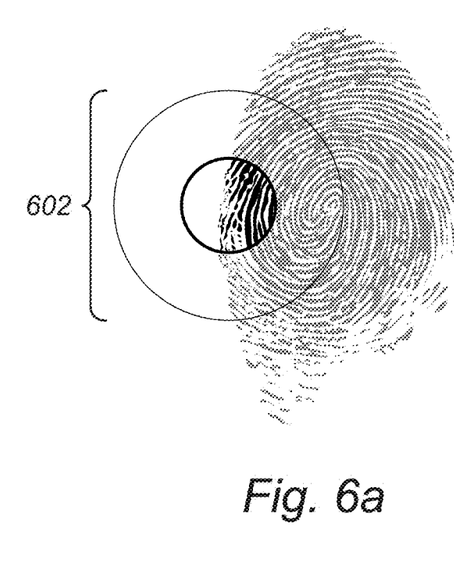
Figure 6B:
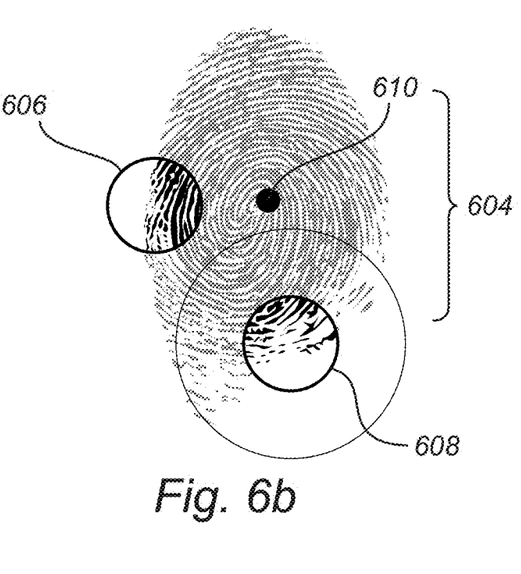
Figure 6C:
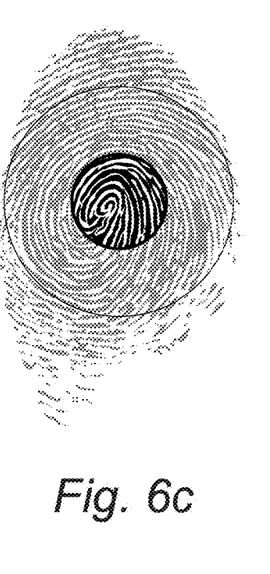

Turning finally to FIGS. 6a-6c exemplifying graphical user guidance provided through the graphical user interface of the mobile phone 100', where the fingerprint sensor 102 is arranged at the backside of the mobile phone 100'. During normal use of the mobile phone 100', the user will not typically be able to visually identify the location of the finger in relation to the fingerprint sensor 102 while viewing the GUI 106. In some implementations the fingerprint sensor 102 may be a so called "under glass sensor", where the sensor possibly may be arranged without any form of guiding depression (indentation). The user will thus not readily get a tactile indication of where the sensor 102 is located.

Accordingly, in FIG. 6a, the user has initially positioned his finger at the fingerprint sensor 102. As may be seen, the finger is positioned slightly off center, namely slightly to the right of the fingerprint sensor 102. The control unit will acquire the first partial fingerprint image of the finger and determine the first arrangement (position) of the finger in relation to the fingerprint sensor 102. The first user guidance 602 will be provided to the user for rearranging the finger in relation to the fingerprint sensor 102, specifically by indication "where" the finger is positioned as compared to the position of the fingerprint sensor 102.

In FIG. 6b the user has taken into account the first user guidance and has repositioned his finger. However, in this case the finger is still not placed in the best possible way as compared with the fingerprint sensor 102, but rather somewhat to high as compared to the fingerprint sensor 102. Accordingly, the second user guidance 604 is provided to the user; where the second user guidance is taking into account both the first and the second arrangement (position) of the finger in relation to the fingerprint sensor 102. Thus, in FIG. 6b the second user guidance 604 will include a combined visualization of both the first 606 and the second 608 arrangement/position of the finger in relation to the fingerprint sensor 102. In addition, the second user guidance comprises a virtual center point 610 of the fingerprint sensor 102, where the virtual center point 610 as shown within the GUI is arranged to directly correspond to the center position of the fingerprint sensor 102. Thus, the user is successively guided for improving the positioning of the finger in relation to the fingerprint sensor 102, rather than just giving "on step" instructions based on a present position of the finger in relation to the fingerprint sensor 102.

Accordingly, in FIG. 6c the user has once again repositioned his finger and now fully understood where his finger is in relation to the fingerprint sensor 102. The finger is accordingly positioned at the center of the fingerprint sensor 102.

Again, the illustrations provided in relation to FIGS. 6a-6c should be seen from the perspective of the fingerprint sensor 102 being positioned at the backside of the mobile phone 100', possibly without the mentioned tactile indication of where the fingerprint sensor 102 is positioned. If just providing the mentioned "one step" instructions, not taking into account earlier placement/positions of the finger in relation to the fingerprint sensor 102, the user will not get the same quick learning of where the finger in fact is positioned as is achieved by the inventive solution.

It should be understood that an "earlier placement/position" of the finger may have taken place at an earlier instance in time, e.g. at an earlier authentication of the finger. For example, the mobile phone 100/100' may have "learned" that the user normally positions his finger slightly to the left of the sensor. Thus, the second user guidance will be selected with this in mind to quickly guide the user to the correct position without having to resort to repeating basic and tiring information to the user.

In addition, even though the illustrations provided in relation to FIGS. 6a-6c are provided from perspective of the fingerprint sensor 102 being positioned at the backside of the mobile phone 100', a similar approach may be also be applied when the fingerprint sensor 102 is arranged at the front side or at the side of the portable electronic device.

The control functionality of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. Additionally, even though the invention has been described with reference to specific exemplifying embodiments thereof, many different alterations, modifications and the like will become apparent for those skilled in the art.

In addition, variations to the disclosed embodiments can be understood and effected by the skilled addressee in practicing the claimed invention, from a study of the drawings, the disclosure, and the appended claims. Furthermore, in the claims, the word "comprising" does not exclude other elements or steps, and the indefinite article "a" or "an" does not exclude a plurality.

What is claimed is:

1. A method of guiding a user of a portable electronic device, the electronic device comprising a display unit configured to display a graphical user interface (GUI), a fingerprint sensor having an array of pixels and configured for capturing a fingerprint representation of a fingerprint pattern of a finger, and a control unit connected to and configured to control an operation of the display unit and the fingerprint sensor, wherein the method comprises:

acquiring, at a first instance in time, a first partial fingerprint image of a corresponding first portion of a fingerprint pattern using the fingerprint sensor;

determining, based on the first partial fingerprint image, a first arrangement of the finger in relation to the fingerprint sensor;

selecting a first user guidance based on the first finger arrangement;

providing the first user guidance to the user for rearranging the finger in relation to the fingerprint sensor;

acquiring, at a second instance in time, a second partial fingerprint image of a corresponding second portion of the fingerprint pattern using the fingerprint sensor;

determining, based on the second partial fingerprint image, a second arrangement of the finger in relation to the fingerprint sensor;

determining a difference between the first and the second finger arrangement;

estimating an experience level for the user;

selecting a second user guidance taking into account both the first and the second finger arrangement, wherein the selected second user guidance is further based on the estimated experience level for the user; and providing the second user guidance to the user for arranging the finger in relation to the fingerprint sensor.

2. The method according to claim 1, wherein the selected second user guidance is further based on a difference between the first and the second finger arrangement.

3. The method according to claim 1, further comprising:
determining a quality metric for the first partial fingerprint image,
wherein selecting the first user guidance comprises forming a combined single visualization of a position of the finger in relation to the fingerprint sensor and the resulting quality metric.

4. The method according to claim 3, wherein determining the quality metric for the first partial fingerprint image comprises at least one of:
determining an area of the fingerprint pattern of the finger as compared to a total area of the fingerprint sensor;
determining a contrast level for the first partial fingerprint image; and
determining an indication of a possibility of successful feature extraction from the first partial fingerprint image.

5. The method according to claim 1, wherein selecting the second user guidance comprises:
forming a visualization to be provided within GUI of both the first and the second finger arrangement.

6. The method according to claim 1, wherein the first and the second arrangement of the finger in relation to the fingerprint sensor corresponds to at least one of a lateral position of the finger in relation to the fingerprint sensor and an indication of a pressure level of the finger contacting the fingerprint sensor.

7. The method according to claim 1, wherein the first and the second user guidance is context adapted depending on the first and the second fingerprint arrangement.

8. The method according to claim 1, wherein the first user guidance is a graphical representation of relative position of the finger in relation to the fingerprint sensor.

9. The method according to claim 8, wherein the graphical representation comprises a histogram.

10. The method according to claim 9, wherein the histogram is configured to show a lateral position of the finger in relation to the fingerprint sensor.

11. The method according to claim 8, wherein the graphical representation comprises a heat map.

12. The method according to claim 1, wherein selecting the first guidance comprises:
comparing the first finger arrangement with a desired arrangement of the finger in relation to the fingerprint sensor, and
determining a graphical representation corresponding to a result of the comparison.

13. The method according to claim 1, wherein the fingerprint sensor is mounted at a side of the electronic device, essentially perpendicular to the display unit.

14. The method according to claim 1, wherein the display unit is arranged at a front side of the electronic device and the fingerprint sensor is mounted at a back side of the electronic device.

15. The method according to claim 14, wherein the first user guidance is visualized within the GUI at a relative position corresponding to a position of mounting the fingerprint sensor at the back side of the electronic device.

16. The method according to claim 1, wherein selecting the second user guidance based on the first and the second finger arrangement comprises:
comparing the difference between first finger arrangement and the second finger arrangement with a desired rearrangement of the finger in relation to the fingerprint sensor.

17. The method according to claim 16, wherein if the difference between first finger arrangement and the second finger arrangement is less than the desired rearrangement of the finger in relation to the fingerprint sensor, then the second user guidance is selected to be an instruction video for guiding the user in using the fingerprint sensor.

18. The method according to claim 16, wherein the desired rearrangement corresponds to at least a 10% repositioning of the finger in relation to the fingerprint sensor.

19. The method according to claim 1, wherein at least one of the first and the second user guidance is provided to the user by displaying at least one of the first and the second user guidance through the GUI.

20. The method according to claim 1, wherein the second user guidance is different from the first user guidance.

21. The method according to claim 1, wherein determining the first and the second finger arrangement further comprises:
determining a quality metric for the first and the second partial fingerprint image, respectively.

22. A portable electronic device, comprising:
a display unit configured to display a graphical user interface (GUI);
a fingerprint sensor having an array of pixels and configured for capturing a fingerprint representation of a fingerprint pattern of a finger, and
a control unit electrically connected to the fingerprint sensor and the display unit, wherein the control unit is configured to:
acquire, at a first instance in time, a first partial fingerprint image of a corresponding first portion of a fingerprint pattern using the fingerprint sensor;
determine, based on the first partial fingerprint image, a first arrangement of the finger in relation to the fingerprint sensor;
select a first user guidance based on the first finger arrangement;
provide the first user guidance to the user for rearranging the finger in relation to the fingerprint sensor;
acquire, at a second instance in time, a second partial fingerprint image of a corresponding second portion of the fingerprint pattern using the fingerprint sensor;
determine, based on the second partial fingerprint image, a second arrangement of the finger in relation to the fingerprint sensor;
determine a difference between the first and the second finger arrangement;
estimate an experience level for the user;

select a second user guidance taking into account both the first and the second finger arrangement, wherein the selected second user guidance is further based on the estimated experience level for the user; and provide the second user guidance to the user for arranging the finger in relation to the fingerprint sensor.

23. The portable electronic device according to claim 22, wherein the fingerprint sensor is employing capacitive sensing technology.

24. The portable electronic device according to claim 22, wherein the fingerprint sensor is mounted at a side of the electronic device, essentially perpendicular to the display unit.

25. The portable electronic device according to claim 22, wherein the control unit is further configured for general operation of the portable electronic device.

26. The portable electronic device according to claim 22, wherein the portable electronic device is a mobile phone.

27. A computer program product comprising a non-transitory computer readable medium having stored thereon computer program means for a control unit adapted for controlling a portable electronic device, the electronic device comprising a display unit configured to display a graphical user interface (GUI), a fingerprint sensor having an array of pixels and configured for capturing a fingerprint representation of a fingerprint pattern of a finger, and a control unit connected to and configured to control an operation of the display unit and the fingerprint sensor, wherein the computer program product comprises:

code for acquiring, at a first instance in time, a first partial fingerprint image of a corresponding first portion of a fingerprint pattern using the fingerprint sensor;

code for determining, based on the first partial fingerprint image, a first arrangement of the finger in relation to the fingerprint sensor;

code for selecting a first user guidance based on the first finger arrangement;

code for providing the first user guidance to the user for rearranging the finger in relation to the fingerprint sensor;

code for acquiring, at a second instance in time, a second partial fingerprint image of a corresponding second portion of the fingerprint pattern using the fingerprint sensor;

code for determining, based on the second partial fingerprint image, a second arrangement of the finger in relation to the fingerprint sensor;

code for determining a difference between the first and the second finger arrangement;

code for estimating an experience level for the user;

code for selecting a second user guidance taking into account both the first and the second finger arrangement, wherein the selected second user guidance is further based on the estimated experience level for the user; and code for providing the second user guidance to the user for arranging the finger in relation to the fingerprint sensor.

\* \* \* \* \*

UNITED STATES PATENT AND TRADEMARK OFFICE
CERTIFICATE OF CORRECTION

PATENT NO.           : 9,514,349 B2                                Page 1 of 1
APPLICATION NO.      : 15/054179
DATED                : December 6, 2016
INVENTOR(S)          : Sebastian Weber et al.

It is certified that error appears in the above-identified patent and that said Letters Patent is hereby corrected as shown below:

On the Title Page

(73) Assignee should read:   FINGERPRINT CARDS AB, GÖTEBORG, SWEDEN (SE)

Signed and Sealed this
Seventh Day of February, 2017

Michelle K. Lee
*Director of the United States Patent and Trademark Office*